United States Patent [19]

Stratton

[11] Patent Number: 4,723,166
[45] Date of Patent: Feb. 2, 1988

[54] NOISE ADJUSTED RECURSIVE FILTER

[75] Inventor: Boyd L. Stratton, Woodside, Calif.

[73] Assignee: Harris Corporation, Melbourne, Fla.

[21] Appl. No.: 850,956

[22] Filed: Apr. 11, 1986

[51] Int. Cl.⁴ .......................................... H04N 5/213
[52] U.S. Cl. .................................................. 358/167
[58] Field of Search .................... 358/36, 167, 965, 37, 358/166, 165, 160

[56] References Cited

U.S. PATENT DOCUMENTS

| 4,064,530 | 12/1977 | Kaiser | 358/36 |
| 4,249,210 | 2/1981 | Storey | 358/167 |
| 4,296,436 | 10/1981 | Achiha | 358/105 |
| 4,367,490 | 1/1983 | Riederer | 358/167 |

Primary Examiner—Tommy P. Chin
Attorney, Agent, or Firm—Tarolli, Sundheim & Covell

[57] ABSTRACT

A noise adjusted recursive filtering apparatus is presented for use in processing video signals having picture portions and predetermined nonpicture portions. A noise detector responds to video signals during a nonpicture portion for providing a noise signal having a magnitude representative of the average noise level on the video signal. A recursive filter is provided for filtering the video signal and this filter includes a delay for delaying the input video signal together with circuitry for determining the difference between a present input video signal and a delayed video signal. The difference signal as well as the noise level signal are employed for purposes of providing a correction signal which is added to the input signal to provide an output video signal. The correction signal is a nonlinearly related percentage of the difference signal and varies as a function of the difference signal and the noise level signal.

10 Claims, 10 Drawing Figures

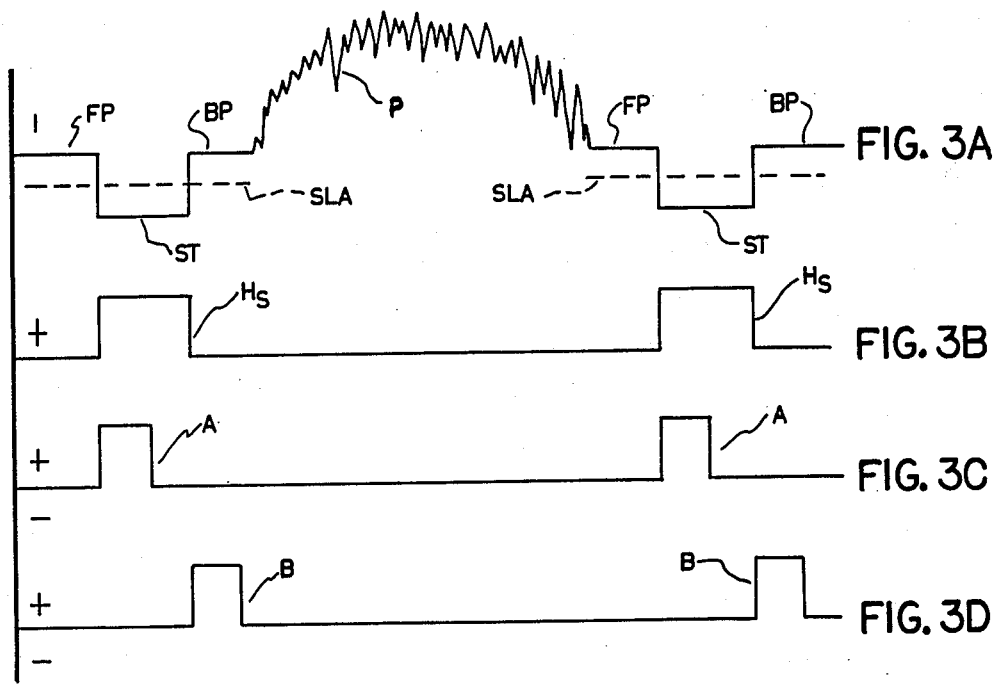
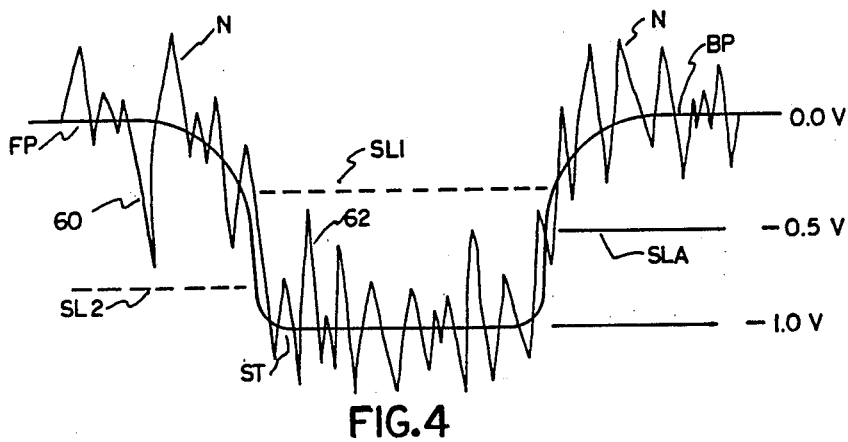
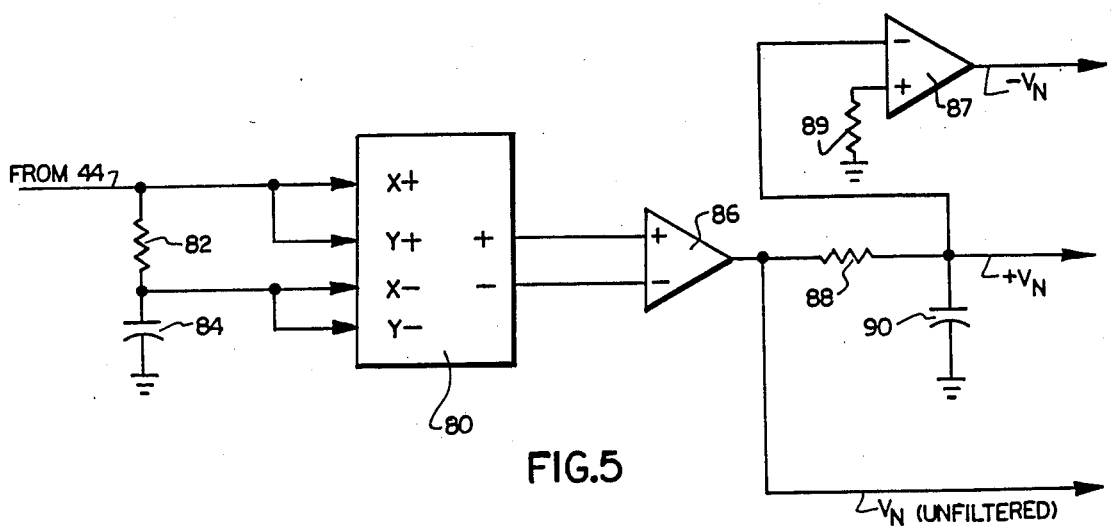

NOISE ADJUSTED RECURSIVE FILTER

BACKGROUND OF THE INVENTION

This invention relates to the art of processing video signals and, more particularly, to improvements in recursive filters.

Recursive filters are known in the art and an example takes the form of the U.S. patent to A. Kaiser et al., U.S. Pat. No. 4,064,530. The recursive filter described there serves to reduce noise in a color television signal, even in the presence of motion between successive frames. The system includes a delay or frame storage device for storing a single television frame and a summing device for adding a fractional amplitude portion of the stored signal to a fractional amplitude portion of the present or incoming video signal. The system functions as a recursive filter and is operative automatically to change the fractional amplitude portion of the stored signal fed back to the summing device as a function of the difference between the stored and present signals. This changes the integration time constant of the filter so as to accommodate a certain amount of motion between the arriving signal and the stored frames. Motion is detected as it exists between stored frames and the incoming signal as the picture proceeds element-by-element through the system, and in response to the evaluation of such motion alters the contribution of the stored past signals to the noise reduced video output signal. If a picture element from the same scene object in the stored past signals is sufficiently different in amplitude from the same element in the arriving video signal, the past history of that picture is ignored and only the present signal is transmitted to the output terminal.

In the Kaiser et al. system, supra, no provision is made for adjusting the fractional amplitude portion of the stored signal which is fed back into the summing device as a function of noise as well as a function of the difference between the stored and the present signals. To the contrary, Kaiser et al. provides only for adjustment of the fractional amplitude portion of the stored signal as a function of the difference between the stored and the present signals.

It is, however, known to provide a noise measurement circuit in conjunction with a video noise reduction system as is described in the patent to R. Storey et al., U.S. Pat. No. 4,249,210. Storey contemplates a somewhat different filtering than that of Kaiser, supra. In Storey et al., a signal is derived from a preceding output signal and is then subtracted from the input signal for the current field to provide a difference signal. Low amplitude portions of the difference signal are attenuated relative to the high amplitude portions thereof. The thus attenuated signal is added to the preceding output signal to provide a new output signal for the current field. While the system operates differently than that of Kaiser, Storey et al. nevertheless contemplates that a noise measurement circuit be employed for measuring the noise on the difference signal and then adjusting the gain of a variable gain element employed in attenuating the difference signal as a function of the output obtained from the noise measurement circuit.

SUMMARY OF THE INVENTION

It is an object of the present invention to provide improvements to a recursive filter system so that the portion of a difference signal which is added to the present input signal is adjusted in dependence upon noise in the video signal.

It is a still further object of the present invention to provide a noise adjusted frame recursive filter which is adjusted for noise as measured during a nonpicture portion of the video signal.

In accordance with the present invention, there is provided a noise adjusted recursive filtering apparatus for processing video signals having picture portions and predetermined nonpicture portions. The noise detector is responsive to the video signal during a nonpicture portion for providing a noise signal having a magnitude representative of the average noise level on the video signal. A recursive filter is provided for filtering the video signal and this filter employs a delay means for delaying the video signal, together with means for determining the difference between a present input video signal and a delayed signal. Circuitry is employed which responds to the difference as well as the noise signal for providing a fractional difference signal to be added to the input signal to provide a new output signal.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein:

FIGS. 3A-3D are waveforms useful in describing the operation herein;

FIG. 4 is a waveform relating to the operation of the sync detector;

FIG. 5 illustrates the noise detector in greater detail than that illustrated in FIG. 2;

DESCRIPTION OF PREFERRED EMBODIMENT

Figure 1:
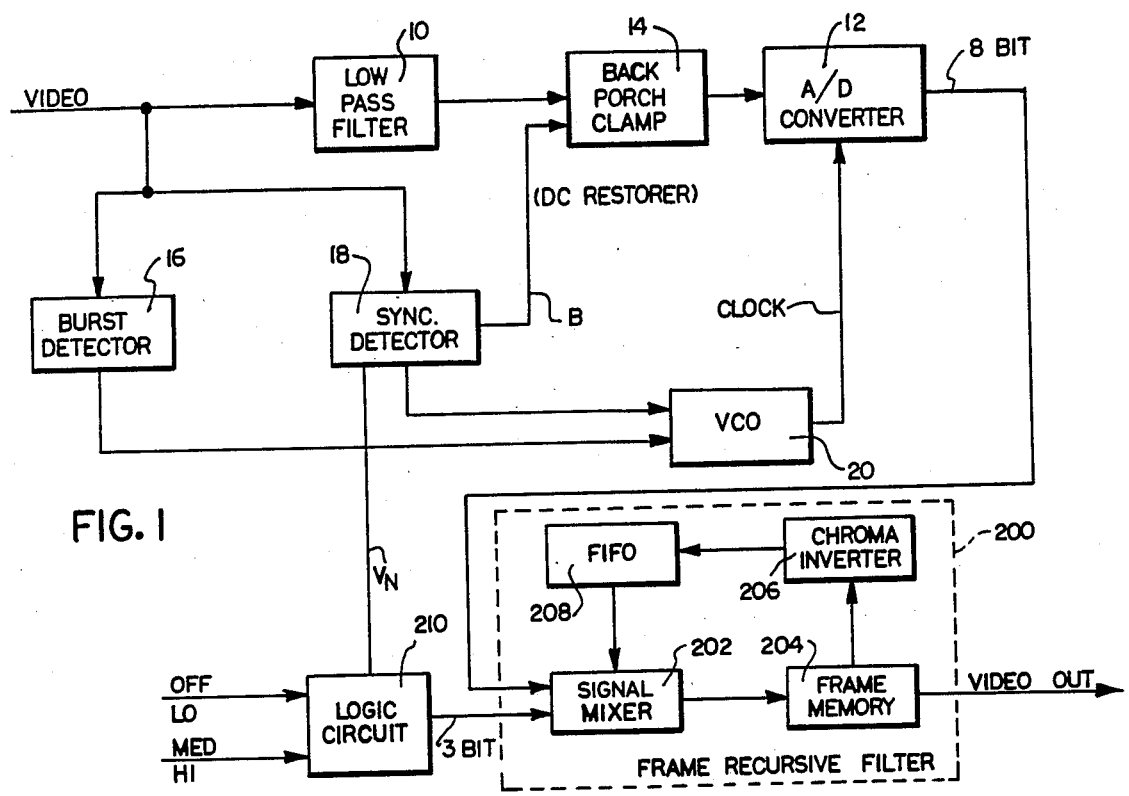
FIG. 1 is a schematic-block diagram illustration of a portion of a frame synchronizer employing the present invention.

Reference is now made to the drawings for purposes of presenting a preferred embodiment of the invention only and not for purposes of limiting same. Reference is now made to FIG. 1 which illustrates a portion of an input processor circuit of a frame synchronizer for processing the signals. The composite video signal is passed by a low pass filter 10, which in this example may be considered as passing signals up to a frequency of 5.5 MHz. This is within the range of operation of an analog-to-digital converter 12 which converts the analog video signal into a train of 8 bit digital samples which may be supplied to a frame storage for subsequent use. Prior to the video signal being applied to the analog-to-digial converter 12, it is passed through a back porch clamp circuit 14 to clamp a predetermined nonpicture portion to a desired level. Sometimes a back porch clamp circuit is referred to as a DC restorer and both terms may be employed herein for the same circuit. In this application, a video signal is clamped to a DC level on the order of −2.0 volts in the back porch portion of the video signal. The intelligence or picture content portion of the video signal will then vary between −2 volts and 0 volts which is within the operating range of the analog-to-digital converter. In some applications, the video signal may be clamped to ground level or some other desired signal level. Additionally, the circuitry in FIG. 1 includes a burst detector 16, which may be of conventional design, and a sync detector 18, which is conventionally employed for supplying timing information to a voltage controlled oscillator 20 which, in turn, provides clock pulses to operate the analog-to-digital converter 12.

The output of the analog-to-digital converter in this embodiment is preferably noise reduced by a digital noise reducer 200. This may take a form conventional in the art and, for example, in the embodiment illustrated, it takes the form of a frame recursive filter employing a signal mixer 202, a frame memory 204, a chroma inverter 206 and an asynchronous first-in, first-out memory buffer 208 interconnected as illustrated in FIG. 1. This digital noise reducer is a frame recursive filter wherein each pixel of a stored image in the frame memory 204 is successively updated once per frame by mixing it at a signal mixer 202 with incoming data obtained from the analog-to-digital converter 12, with the incoming data corresponding to the same pixel location. The mix ratio employed will control the degree of filtering. If mostly memory data is used in the mix, then the degree of filtering is high, and the image will be slow to respond to changes (motion or noise) in the input signal. If mostly input data is used, then the degree of filtering is low, and the image will quickly respond to changes in the input signal. Front panel selection is provided for the digital noise reducer and this includes off, low, med and hi switch positions for use in determining the mix ratio. Additionally, in accordance with the present invention, the front panel control settings are combined with measured noise obtained from a noise detector circuit located within the sync detector 18. A logic circuit 210, to be described in greater detail hereinafter, combines the measured noise with the front panel control settings. The pixel-by-pixel difference between the stored and input levels is also used to obtain the mix ratio. Pixel differences which are small are assumed to be the effect of random noise, and are consequently heavily filtered. Differences which are large are assumed to be the effect of motion in the picture, and are lightly filtered.

Because the chroma signal phase changes 180 degrees between one frame and the next in an NTSC video signal, a chroma inverter 206 is employed in the frame delayed data path (otherwise the chroma signal would be lost in the mixing process). The memory buffer 208 is an asynchronous first-in, first-out memory buffer which is employed to convert the frame delayed signal from memory timing (which is locked to the output signal) to the input timing (derived from the input signal), making possible the pixel-by-pixel alignment of input and frame delayed data required by the signal mixer 202. The chroma inverter 206 is preferably an adaptive filter used in the frame delayed signal path to extract the chroma portion of the signal, invert its polarity, and recombine it with the noninverted luminance portion of the signal, thereby correcting the chroma phase difference between the input and the frame-delayed signals prior to mixing the signals at mixer 202.

Figure 2:
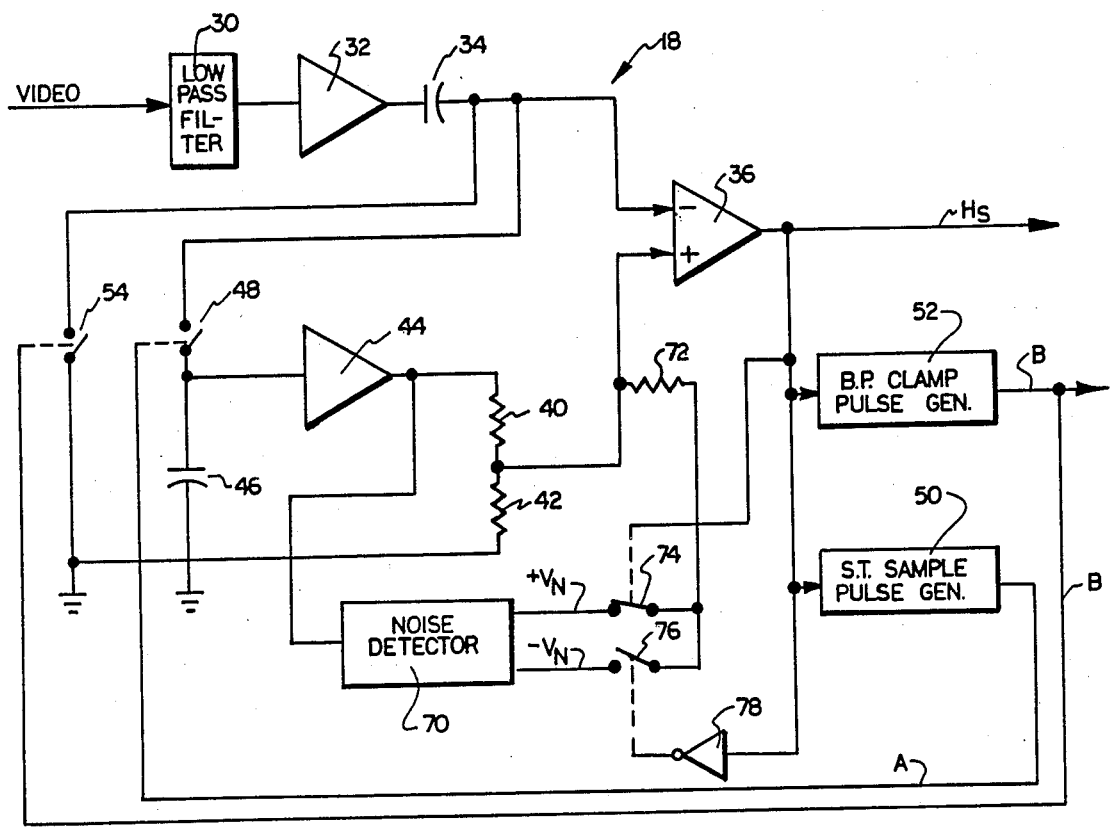
FIG. 2 is a schematic-block diagram illustration of the sync detector shown in the block diagram of FIG. 1.

Reference is now made to FIG. 2 which provides a more detailed illustration of the sync detector 18 in FIG. 1. The video signal is first passed through a low pass filter 30 which, for example, passes signals having a frequency up to 1.5 MHz. This, then, is a small portion of the frequency band of the video signal. The filtered video signal is then passed by a buffer 32 and a capacitor 34 to the negative input of a comparator 36 which operates as a sync slicer. This comparator 36 compares the filtered video signal with a threshold for the purposes of recovering the sync signal from the filtered video signal. This may be appreciated with reference to the waveforms in FIGS. 3A and 3B.

The waveform in FIG. 3A is representative of the composite video signal. As seen, the video signal has a picture portion P intermediate the front porch portion FP and a back porch portion BP. A horizontal sync signal separates the front porch portion from the back porch portion and this sync signal is referred to as the sync tip ST. Conventionally, the front porch portion and the back porch portion are at the same DC signal level, such as ground. The sync tip is also maintained at a constant level which is conventionally negative with respect to the front porch or back porch portions.

The sync slicer comparator 36 compares a threshold signal with the filtered composite video signal in order to recover or detect the horizontal synchronizing signal and produce a horizontal sync signal $H_S$ in accordance therewith (see FIG. 3B). The threshold in FIG. 2 is obtained from the junction of a pair of resistors 40 and 42 connected between the output of a buffer 44 and ground. It should be noted that whereas ground potential is illustrated herein, a different reference level may be employed. The buffer 44 obtains its input from a charge stored on a capacitor 46, a sample and hold arrangement. This arrangement also includes a switch 48 which is periodically closed in synchronization with detection of the horizontal sync pulse to complete a path so that the filtered composite video signal may be sampled and stored in capacitor 46. The sampled voltage takes place during the sync tip portion ST of the video signal. The capacitor 46 charges toward this level and the charge of the capacitor is buffered through buffer 44 and applied across the voltage divider consisting of resistors 40 and 42 to provide a threshold level to the positive input of the sync slicer comparator 36. Whenever the filtered video input signal becomes negative with respect to the threshold, the sync slicer 36 will output a positive pulse representing the horizontal sync signal $H_S$, as is seen in FIG. 3B. The leading edge of the horizontal sync signal triggers a sync tip sample pulse generator 50 to produce a sync tip control signal A (FIG. 3C) which is then employed for closing switch 48 during the sync tip portion ST of the filtered video signal. Similarly, the lagging edge of the horizontal sync signal $H_S$ triggers a back porch clamp pulse generator 52 to produce a trigger signal B (see FIG. 3D) which is employed to temporarily close a switch 54 so as to clamp the filtered video signal to ground during the back porch portion BP.

Referring again to FIGS. 2, 3A and 3B, it is recalled that the horizontal sync signal $H_S$ is produced when the fitered video signal has its DC level change to the point that it is more negative than the threshold supplied to the positive input of the sync slicer 36. The reference level or threshold may be called the slice level SLA. This is illustrated in FIG. 3A as being midway between that of the back porch portion BP and the sync tip portion ST. For example, if the back porch portion BP is at 0 volts and the sync tip portion ST is normally at $-1.0$ volts, then the threshold or slice level SLA may be set at $-0.5$ volts. Consequently, as the video signal becomes more negative than the threshold or slice level SLA, the output of amplifier 36 will go positive and stay positive to provide the horizontal sync signal $H_S$ until the video sync signal once again increases positively toward the back porch level and becomes more positive than the threshold or slice level SLA. This is illustrated in FIGS. 3A and 3B. The discussion thus far assumes that there is no noise to contend with during the horizontal sync recovery.

Reference is now made to FIG. 4 which illustrates the video signal having noise and located on what was assumed to be constant level nonpicture portions, including the front porch FP, the sync tip ST, and the back porch BP, as well as the transitions between these levels. The noise includes peaks and valleys which may cross the normal slice level SLA at times which will create a false indication of a horizontal sync signal recovery. For example, a noise valley point 60 in FIG. 4 is clearly more negative than the slice level SLA and this would cause the sync slicer 36 to erroneously produce an indication of a horizontal sync signal. Similarly, a noise peak point 62 is clearly more positive than the slice level SLA and would cause the sync slicer 36 to erroneously provide an indication that the horizontal sync recovery has been completed. Consequently, noise such as that illustrated in FIG. 4 can provide erroneous horizontal sync recovery information.

In accordance with the embodiment illustrated in FIG. 2, the threshold or slice level is varied in the presence of noise from that of its low noise or normal threshold level SLA. For example with reference to FIG. 4, in the presence of noise, the negative going valley point 60 while being more negative than slice level SLA is not more negative than an offset slice level SL2. However, as the video signal becomes more negative than the offset slice level SL2, the sync slicer 36 will provide a positive horizontal sync signal. Similarly, whereas the noise peak 62 is more positive than the low noise or normal slice level SLA, it is not more positive than the modified or offset slice level SL1. However, as the video signal becomes more positive, it will exceed that of the offset slice level SL1, causing a termination of the horizontal sync signal. This operation is achieved by employing a noise detector generating information to modify the slice level during noisy conditions as measured during one of the predetermined nonpicture portions of the video signal.

In the embodiment of FIG. 2, the noise level is measured by a noise detector 70, to be described in greater detail hereinafter, which measures noise during the sync tip sample periods and provides an output indication representative of the average noise. This includes a positive signal $+V_N$, as well as a negative signal $-V_N$ to be added or subtracted to the normal slice level SLA so as to vary the slice level in accordance with measured noise. Both of these offset adjustments are supplied to the positive input of the sync slicer 36 by way of a resistor 72 which scales the offset signal. These offset signals are supplied by way of switches 74 and 76 which operate such that when one of the switches is closed, the other is open. The switch control is obtained from the sync slicer 36 such that when the output is positive (during a sync tip interval), the switch 74 is closed, as is shown in FIG. 2, so that the slice level is raised to that of slice level SL1. When the output of the sync slicer 36 is at ground potential (during the front porch or back porch portions) the switch 74 is open and switch 76 becomes closed by way of an inverter 78. It is to be appreciated that whereas switches 74 and 76 are illustrated as simple mechanical switches, they, in practice, would normally take the form of solid state switches operated in a well known manner. The noise detector 70 is discussed in greater detail with reference to FIG. 5.

Reference is now made to FIG. 5 which illustrates the noise detector in greater detail. This detector may be considered as an analog multiplier filtered at its input and its output. The analog multiplier 80 may conventionally take the form of an analog multiplier provided by Motorola Corporation and known as their Model MC1495. The input to multiplier 80 is taken from the output of buffer 44 (FIG. 2) and is supplied to unfiltered X+ and Y+ inputs of the multiplier. The signal from buffer 44 is also applied through a resistor 82 and a capacitor 84 to ground. The junction of resistor 82 and capacitor 84 supplies a filtered second input to the X− and Y− inputs of the multiplier 80. The multiplier effectively multiplies the difference between the inputs applied to the X+ and X− terminals by the difference between the inputs applied to the Y+ and Y− inputs. The outputs taken from the positive and negative output terminals of the multiplier 80 provide a balanced output and this is supplied to an operational amplifier 86 with its output being supplied to a filter including resistor 88 and a capacitor 90 taken to ground. The signal across resistor 82 represents fluctuations of the input signal at 44 caused by noise. This signal is multiplied by itself by multiplier 80 to give an absolute representation of noise at the output of amplifier 86. This, then, provides an output $+V_N$ which represents the average noise over several lines of video information. A negative output $-V_N$ may be obtained with an inverter amplifier 87 having its positive input connected to ground through a resistor 89.

The measured noise (FIG. 5) is supplied to the logic circuit 210 (FIG. 1) which combines the measured noise with the front panel control settings for use along with the pixel-to-pixel differences in determining the mix ratio. The logic circuit 210 and the signal mixer 202 are illustrated in greater hereinafter with reference to FIGS. 6 and 7 respectively.

Figure 6:
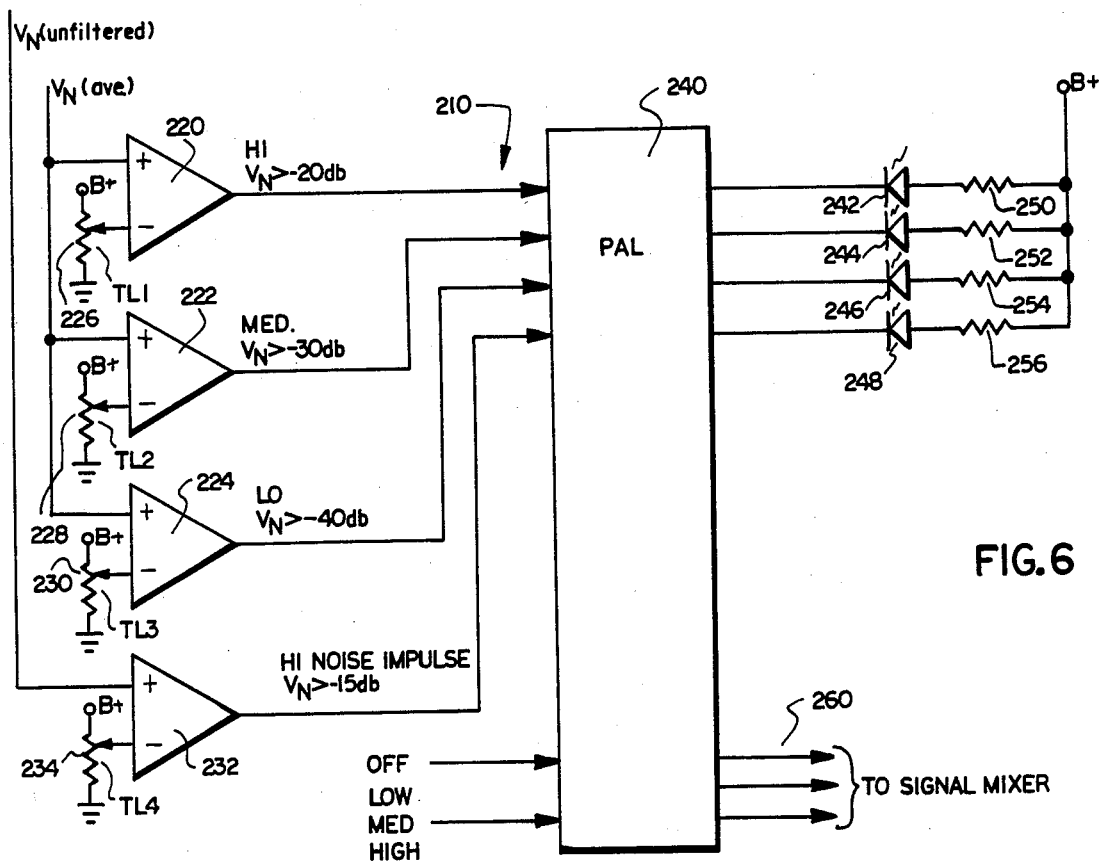
FIG. 6 is a schematic-block diagram illustration of the logic circuit illustrated in FIG. 1.

Reference is now made to FIG. 6 which illustrates the logic circuit 210 in greater detail than that in FIG. 1. The logic circuit as shown in FIG. 6 has two inputs taken as the unfiltered and filtered noise measurements; that is, $V_N$(unfiltered) and $V_N$. The average noise signal $V_N$ is supplied to an input of each of three signal comparators 220, 222 and 224, each of which produces a positive output signal for a time duration so long as the noise signal is greater than the reference signal. The reference signals at the second input of each of these comparators may be referred to as threshold levels TL1, TL2 and TL3. These are obtained from the wiper arms of potentiometers 226, 228 and 230, respectively. The threshold levels are set such that an output is obtained from comparator 220 when the noise level is considered relatively high, such as being greater than −20 db. Similarly, an output voltage is obtained from comparator 222 for medium noise when the noise level is greater than −30 db. The output of comparator 224 is positive so long as the noise level is low (this is considered as being greater than −40 db). An additional comparator 232 has an input for receiving the unfiltered noise level signal and this is compared with a threshold level TL4 obtained from a potentiometer 234. This threshold is set so that the output of the comparator is positive for high noise impulses which may be greater than −15 db. The outputs of comparators 220, 222, 224 and 232 are supplied to a programmable array logic (PAL) circuit 240. The PAL logic circuit is provided with front panel displays in the form of light emitting diodes 242, 244, 246 and 248. These are connected by means of resistors 250, 252, 254 and 256 to a B+ voltage supply source. These are arranged in conjunction with the logic circuitry so that diode 242 is illuminated when the measured noise approaches −20 db. Similarly, diode 244 is illuminated when the measured noise is in the range of −20 to −30 db. Diode 246 is illuminated when the measured noise is in the range of −30 to −40 db. Also, diode 248 is illuminated when the measured noise is in excess of −40 db.

The operator is provided with front panel control settings to adjust the mix ratio of the digital noise reducer. These settings are OFF, LO, MED., and HI. Suitable switching is provided so that two inputs are supplied to the PAL circuit 240 with each input carrying either a binary 1 or a binary 0 level representative of one of the front panel control settings. The setting of OFF is indicative that all pixel-to-pixel differences will be considered as motion, and hence, no noise reduction is achieved by the digital noise reducer. The setting of LO is indicative that above this setting, pixel-to-pixel differences will be considered as motion and not noise. Similarly, the setting of MED. is indicative that at some higher noise level than LO, the operation will assume that pixel-to-pixel differences of this level will be considered as motion and not noise. Similarly, a selection of HI is indicative that a level greater than that for MED. pixel-to-pixel differences will be considered as motion and not noise. The PAL circuit 240 combines the inputs obtained from comparators 220, 222, 224 and 232 with that obtained from the front panel control settings to provide a three bit output on a mix control bus 260.

Figure 7:
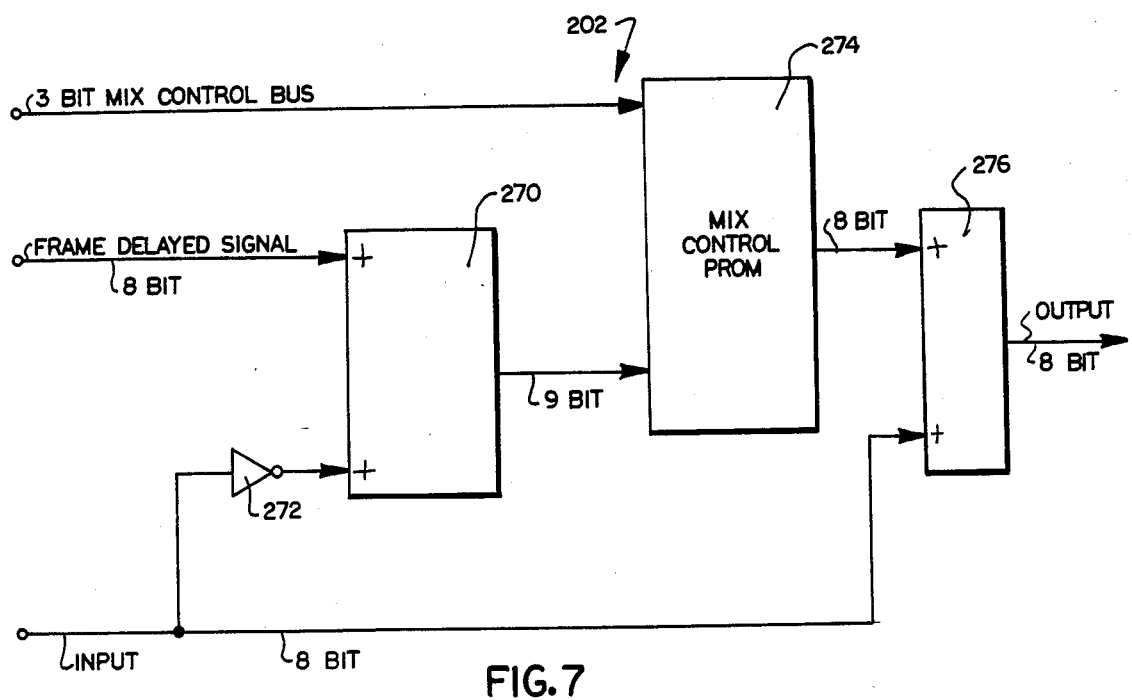
FIG. 7 is a schematic-block diagram illustration of the signal mixer illustrated in FIG. 1.

Reference is now made to FIG. 7 which provides a greater illustration of the signal mixer 202 than that illustrated in FIG. 1. The eight bit frame delayed signal obtained from the frame memory 204 is supplied to the signal mixer, by way of the buffer 208, and is supplied to one input of an ADDER 270. The present input video signal as obtained from the analog-to-digital converter 12 (FIG. 1) is supplied to a second input of ADDER 270 by way of an inverter 272 such that the output as taken from ADDER 270 represents the difference between the frame delayed signal and the input signal. This difference signal is supplied as a nine bit address to a mix control PROM 274. This nine bit address is combined with the three bits from the mix control bus to obtain a twelve bit address for addressing PROM 274. The mix control PROM outputs an 8 bit signal which is a fractional part of the 9 bit difference signal from ADDER 270, the fractional value depending on the 3 bit address on the bus 260. The output of PROM 274 is added to the input video signal by means of an ADDER 276 to provide an eight bit output.

It is to be appreciated that the input video signal and the frame delayed video signal are mixed in proportions which partly depend upon the three bit signal obtained from the control bus. This is a function of the front panel switch control setting as well as the noise level of the input signal, as measured by the noise detector 70. The mix proportion for any given pixel also depends on the pixel-by-pixel difference between the frame delayed signal and the input signal as detected by the signal inverter 272 and ADDER 270. The mix control PROM 274 outputs some part of the difference signal (from 0-100% depending on the desired mix ratio) which is then added to input signal. Thus, depending on the proportion of the difference which is added, the output signal can take on any value between the input signal and the frame delayed signal.

Although the invention has been described in conjunction with a preferred embodiment, it is to be understood that various modifications may be made without departing from the spirit and scope of the invention as defined by the appended claims.

Having described a specific preferred embodiment of the invention, the following is claimed:

1. A noise adjusted recursive filtering apparatus for processing each of a plurality of successive video signals each having a picture portion and predetermined nonpicture portions, comprising:
   noise detector means responsive to each said video signal during one of said nonpicture portions thereof for providing a noise signal having a magnitude representative of a noise level on said video signal;
   recursive filter means for filtering each said video signal and including means for delaying each said video signal, means for determining the difference between said delayed video signal and a successive undelayed one of said video signals, means responsive to said difference and said noise signal for providing a fractional portion of said difference as a correction signal, and means for adding said correction signal to said undelayed video signal to provide an output signal.

2. Apparatus as set forth in claim 1 wherein said predetermined nonpicture portions include at least a front porch portion, a sync tip portion and a back porch portion and said noise detector means is responsive to said video signal during one of said nonpicture portions for providing said noise signal.

3. Apparatus as set forth in claim 2 including noise level comparing means for comparing said noise signal with a plurality of noise reference levels and providing an output indication in accordance therewith for use in energizing noise level indicator means.

4. Apparatus as set forth in claim 3 including a plurality of visual indicator means, each when energized, representative of a different noise level of said video signal and means for interconnecting the visual noise level indicator means with said noise level comparing means for energizing said visual noise level indicator means in dependence upon said output indication.

5. Apparatus as set forth in claim 3 wherein said noise level comparing means includes a plurality of comparator means, each for receiving said noise signal and comparing said noise signal with a different one of said plurality of noise reference levels and providing an output signal so long as said noise signal is greater than said different one of said plurality of noise reference levels.

6. Apparatus as set forth in claim 5 including logic means interconnected with the output of each of said comparator means for providing a multi-bit digital signal having a bit pattern which varies as a function of the noise levels as determined by said plurality of comparator means.

7. Apparatus as set forth in claim 6 wherein said correction signal providing means includes an addressable memory means for storing a plurality of correction signals as multi-bit correction signals at addressable locations within said memory means.

8. Apparatus as set forth in claim 7 including analog-to-digital converting means coupled to said recursive filter means for converting each said picture portion of each said video signal into a plurality of multi-bit video signals, said recursive filter means being a digital frame filtering means for filtering said multi-bit video signals and wherein said difference determining means includes means for determining the difference between one of said undelayed multi-bit video signals and one of said delayed multi-bit video signals to provide a multi-bit difference signal.

9. Apparatus as set forth in claim 8 including circuit means for applying said multi-bit difference signal and said multi-bit noise level signal to said addressable memory means for addressing said addressable memory means to obtain therefrom one of said multi-bit correction signals having a value which is a percentage of said multi-bit difference signal and with the percentage varying as a function of said multi-bit noise level signal as well as said multi-bit difference signal.

10. Apparatus as set forth in claim 9 wherein said means for adding said correction signal to said undelayed video signal is a digital adder means for adding said multi-bit undelayed video signal and said one multi-bit correction signal to provide a multi-bit video output signal.

* * * * *